W. J. TRIGGS.
QUICK RELEASE DEVICE FOR CLAMP BOLTS.
APPLICATION FILED JUNE 15, 1920.
1,435,433.　　　　　　　　　　　　　Patented Nov. 14, 1922.
FIG. I.
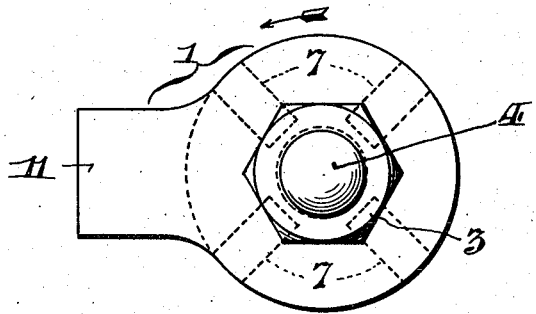
FIG. II.
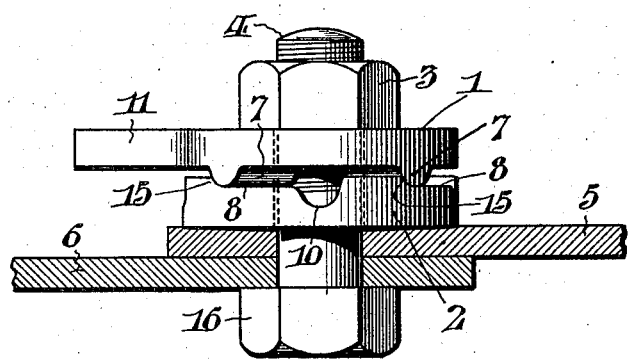
FIG. III.    　　　　　　FIG. IV.
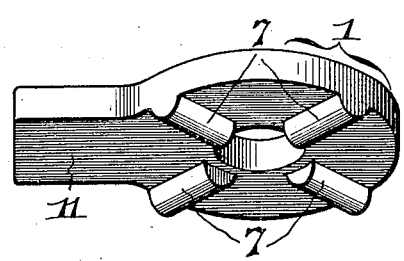   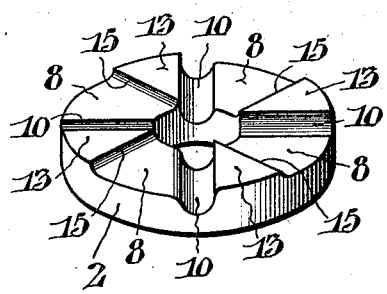
WITNESSES:　　　　　　　　　　　　　INVENTOR:
John E. Bergner　　　　　　　　　William J. Triggs,
James H. Bell　　　　　　　　　　　　BY
　　　　　　　　　　　　　　　　　　　ATTORNEYS.

Patented Nov. 14, 1922.

1,435,433

UNITED STATES PATENT OFFICE.

WILLIAM J. TRIGGS, OF PHILADELPHIA, PENNSYLVANIA.

QUICK-RELEASE DEVICE FOR CLAMP BOLTS.

Application filed June 15, 1920. Serial No. 389,068.

*To all whom it may concern:*

Be it known that I, WILLIAM J. TRIGGS, a citizen of the United States, residing in Philadelphia, in the county of Philadelphia and State of Pennsylvania, have invented certain new and useful Improvements in Quick-Release Devices for Clamp Bolts, whereof the following is a specification, reference being had to the accompanying drawings.

The invention relates to devices useful in association with bolts such as may be employed, for example, in temporarily clamping a pair of overlapped steel plates which are to be riveted or welded together. The object of my invention is to make it possible to quickly release such bolts for ready removal after the desired operations upon the work have been completed.

With this end in view, I have devised an organization which is adapted to be interposed beneath either the head or the nut—of a clamp bolt during initial assembling, and which has capacity for being instantly collapsed when the removal of the bolt is desired.

One important advantage of my invention is the possibility of effecting the ready release of the clamp bolt without necessitating the aid of any special tools for accomplishing this purpose. Other characteristics of my invention are extreme simplicity in design, cheapness in manufacture, and extreme durability in practical use.

Other advantages subsidiary to those already pointed out will become apparent from the detailed description which follows.

Referring to the drawings, Fig. I is a plan view of the quick release device shown in association with a clamp bolt.

Fig. II is an illustration showing the device as assembled in connection with a pair of overlapped plates which are to be held together temporarily, so that work such as punching, riveting, welding, etc., may be performed upon them.

Fig. III is a perspective view of one of the constituent elements or members of the device; and Fig. IV is a similar view of the other or companion member thereof.

From Fig. II, it will be observed that the device comprises two elements or members in the form of centrally apertured discs 1 and 2, which are adapted to be interposed in relative axial superimposition between the end member 3 of the bolt 4 and the work to be temporarily clamped—in the present instance, shown as two overlapped plates 5 and 6. As here shown, the end member 3 with which the device is thus associated is not the integral head (indicated as 16), but is formed by a nut appropriately threaded on the bolt shank. Upon one of its faces, the disc 1 has a series of projections in the form of radial ridges 7 which, in the normal position are arranged to rest against the sectoral surfaces 8 of the disc element 2, and serve to maintain the discs spaced as shown. So long, therefore, as the engagement means of the discs comprising the ridges 7 and the surfaces 8 remain interengaged, the device is expanded. The disc element 2 has formed in its upper face a series of comparatively deep radial notches 10 corresponding in number to the ridges 7 of the element 1. By relative rotative shifting of the elements 1 and 2, these ridges may be brought into registry with the notches 10, with the result that the ridges 7 and surfaces 8 are disengaged and the device instantly collapses automatically,—whereupon the nut 3 may be readily removed by hand, and the bolt withdrawn. In order that the disc elements of the device may be relatively shifted as above noted, one of them, preferably the disc 1, is provided with an extension 11, adapted to be struck in the direction of the arrow in Fig. I, by a hammer or other available implement capable of exerting a blow sufficient to bring this action about. The intermediate segments 13 of the lower disc 2 are offset slightly beyond the plane of the surfaces 8 to afford shoulders 15 which serve as stops in opposition to the radial projections 7, and are functional in preventing relative rotation between the discs during the tightening of the nut 3 when the bolt is initially placed.

Having thus described my invention, I claim:

1. A device of the character described adapted to be interposed beneath the head or nut of a clamp bolt comprising a pair of cooperative elements normally spaced apart, but capable, upon being relatively shifted, of approaching each other to effect instant automatic collapse of the device and release of the bolt for removal, in combination with means for preventing relative displacement of said elements from their normal position during the tightening of the bolt in initial assembling.

2. A device of the character described adapted to be interposed beneath the head or nut of a clamp bolt, comprising a pair of cooperative elements, one of said elements having projections and the other notches, said projections serving to maintain the members normally spaced apart, but being adapted, upon relative shifting of said elements, to recede into the notches to permit instant automatic collapse of the device and release of the bolt for removal.

3. A device of the character described adapted to be interposed beneath the head or nut of a clamp bolt, comprising a pair of cooperative disc elements normally held spaced from one another, but capable, upon relative rotation, of approaching one another to permit instant automatic collapse of the device and release of the bolt for removal.

4. A collapsible device of the character described adapted to be interposed beneath the head or nut of a clamp bolt, and comprising a pair of superposed relatively rotatable disc elements having on their adjacent faces cooperating engagement means for maintaining them spaced apart in their normal angular relation, said engagement means being disengaged to permit said discs to come together upon relative rotation of the discs.

5. A device of the character described comprising a pair of cooperative, centrally apertured disc elements adapted to be interposed in relative axial superimposition beneath the head or nut of a clamp bolt, one of said elements having a number of radial ridges, and the other a corresponding number of radial notches, said ridges serving to maintain the elements normally spaced apart, but being adapted upon relative rotation of said elements, to recede into the notches to permit instant automatic collapse of the device and release of the bolt for removal.

6. A device of the character described comprising a pair of cooperative, centrally apertured disc elements adapted to be interposed in relative axial superimposition beneath the head or nut of a clamp bolt, one of said elements having a number of radial ridges, and the other a corresponding number of radial notches, said ridges serving to maintain the elements normally spaced, but being adapted upon relative rotation of said elements, to recede into the notches to permit instant automatic collapse of the device and release the bolt for removal, the notched disc element also having stop projections functional in opposition to the ridges of the companion element in preventing relative rotation between the two during tightening of the bolt in initial assembling.

7. In combination with a bolt passing through pieces of material to be secured together, and a nut threaded upon the bolt; an expansible unlocking device comprising a pair of sections engaged upon the bolt and normally disposed in relatively expanded position to engage the nut and the adjacent piece of material, means tending to prevent relative rotation of the sections in one direction, and said sections being so formed whereby upon relative rotation in one direction they will be relatively collapsed whereby to leave a space between the nut and the adjacent section.

8. The combination with a bolt passing through pieces to be secured, and a nut threaded upon the bolt; of an unlocking device comprising a pair of disk-like sections disposed upon the bolt and formed upon their meeting faces with alternating ribs and grooves adapted to interfit, the sections being normally disposed with the respective ribs engaging, and a projection on one section whereby it may be relatively rotated to bring the respective ribs and grooves into interfitting engagement.

9. In combination with a bolt passing through pieces to be secured, and a nut threaded upon the bolt, an expansible unlocking device encircling the bolt, and formed of two sections one engaging the nut and the other engaging the adjacent piece to be secured, said sections being relatively movable into collapsed position whereby to leave a space between the device and the nut.

10. In combination with a bolt passing through pieces to be clamped, and a nut threaded upon the bolt, an expansible unlocking device encircling the bolt in normally expanded position and engaging the nut and the adjacent piece through which the bolt extends, said device being rotatably collapsible whereby to leave a space between the device and the nut.

In testimony whereof, I have hereunto signed my name at Philadelphia, Pennsylvania, this 11th day of June, 1920.

WILLIAM J. TRIGGS.

Witnesses:
JAMES H. BELL,
E. L. FULLERTON.